Figure 21:
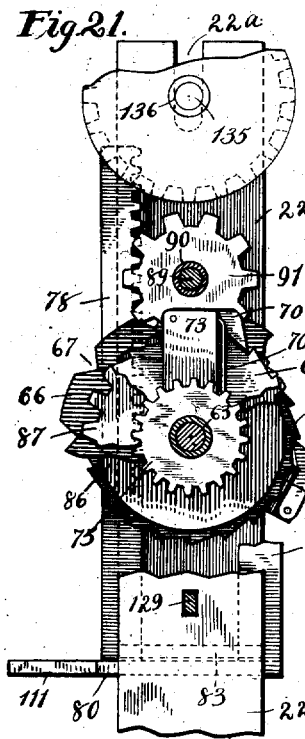

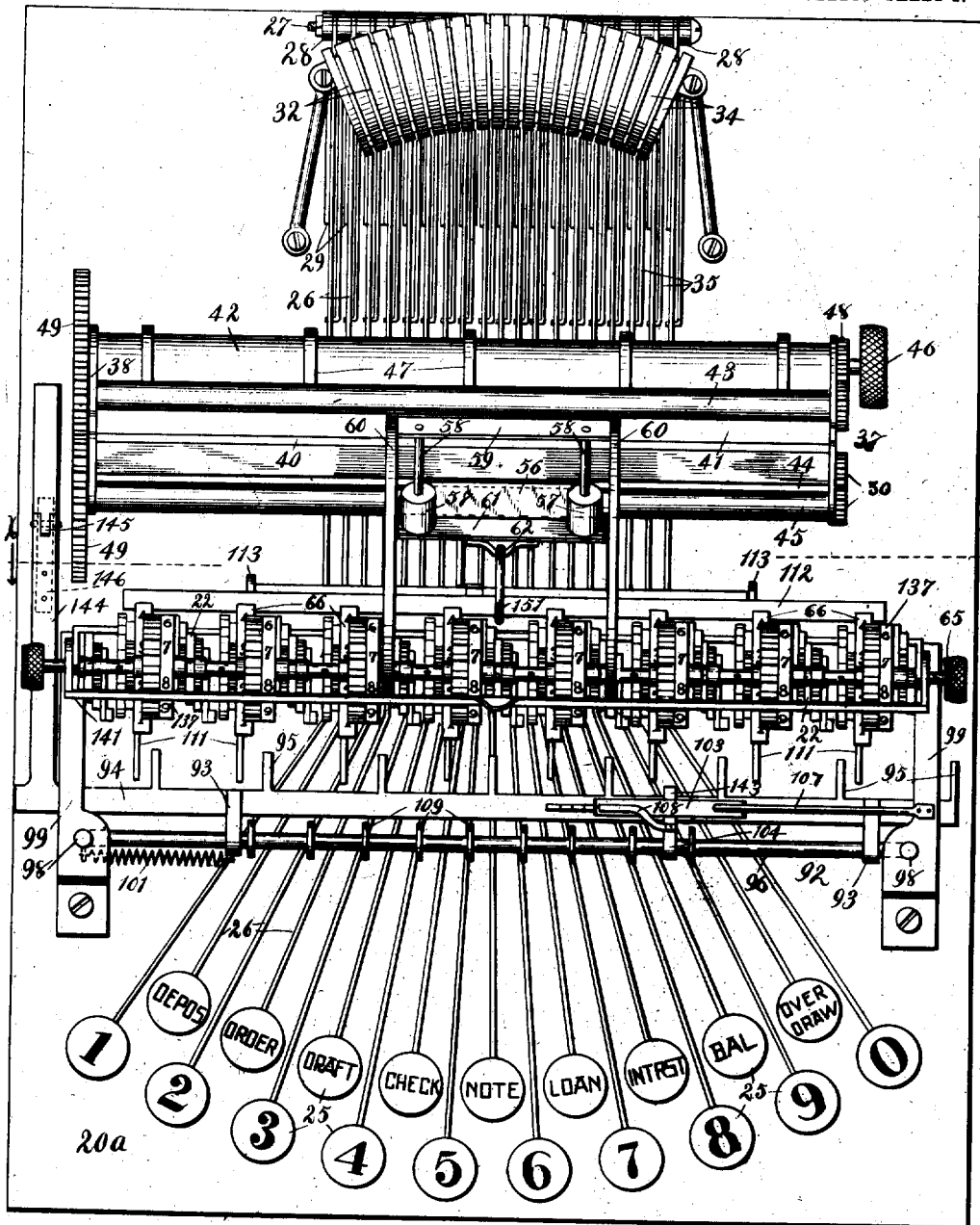

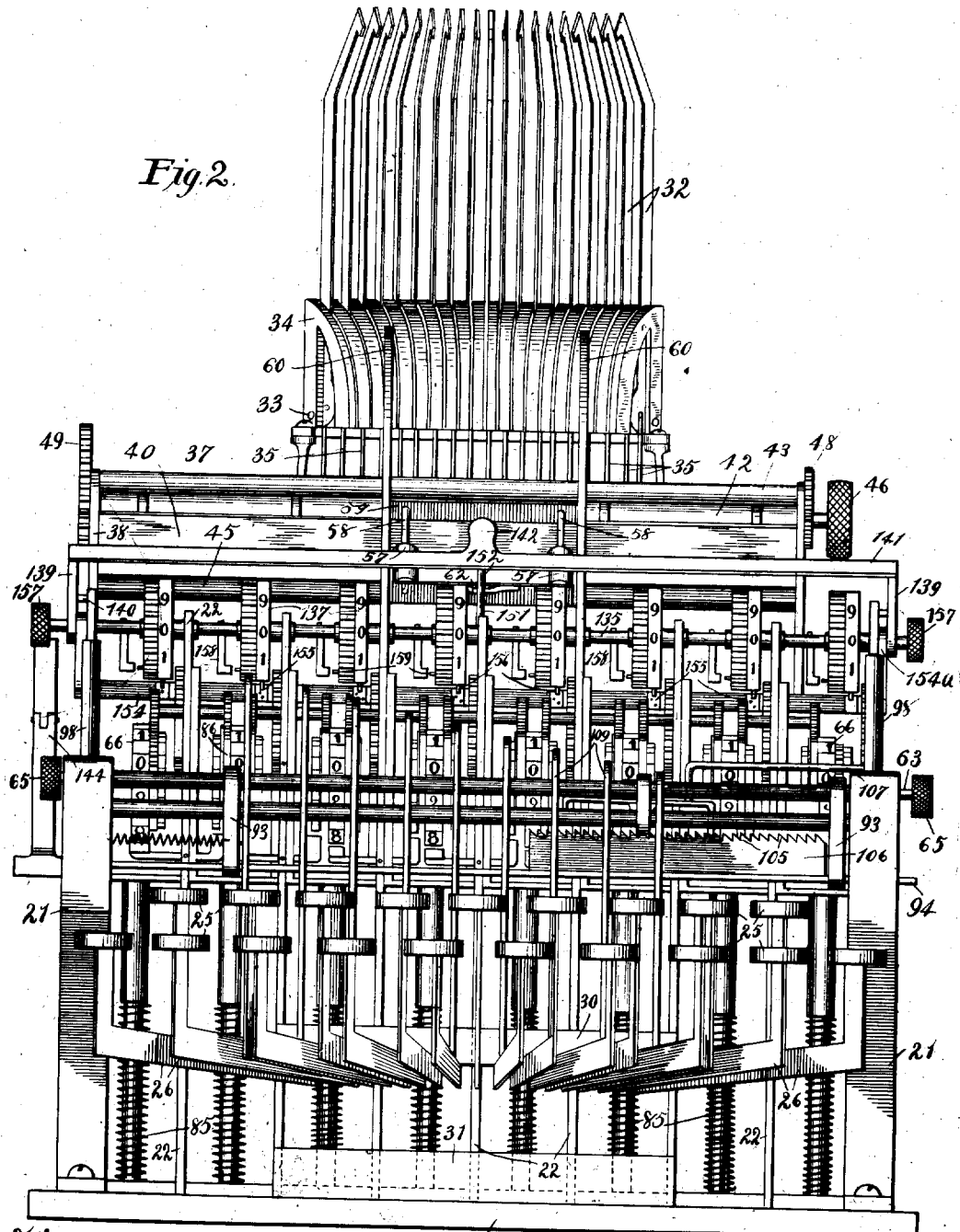

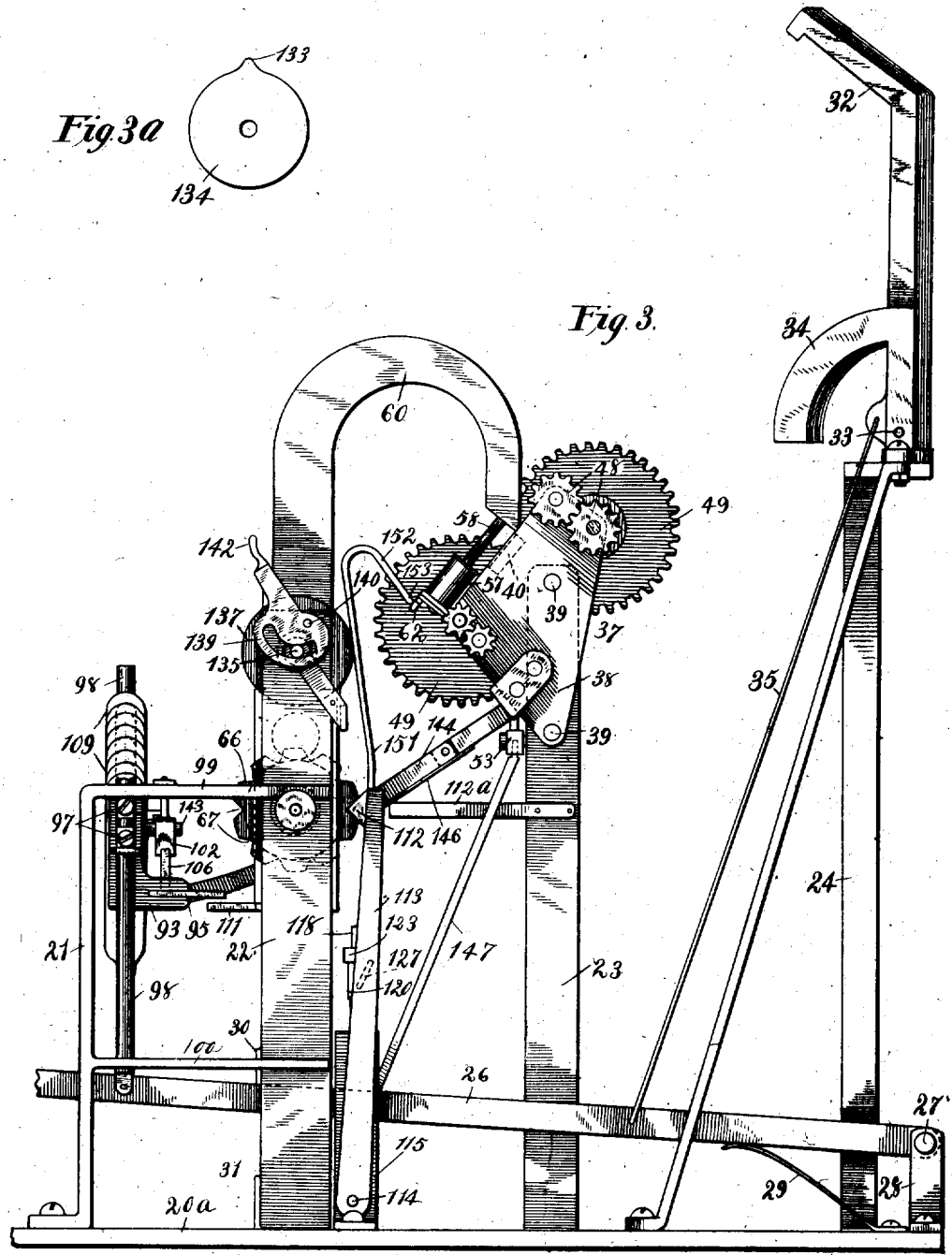

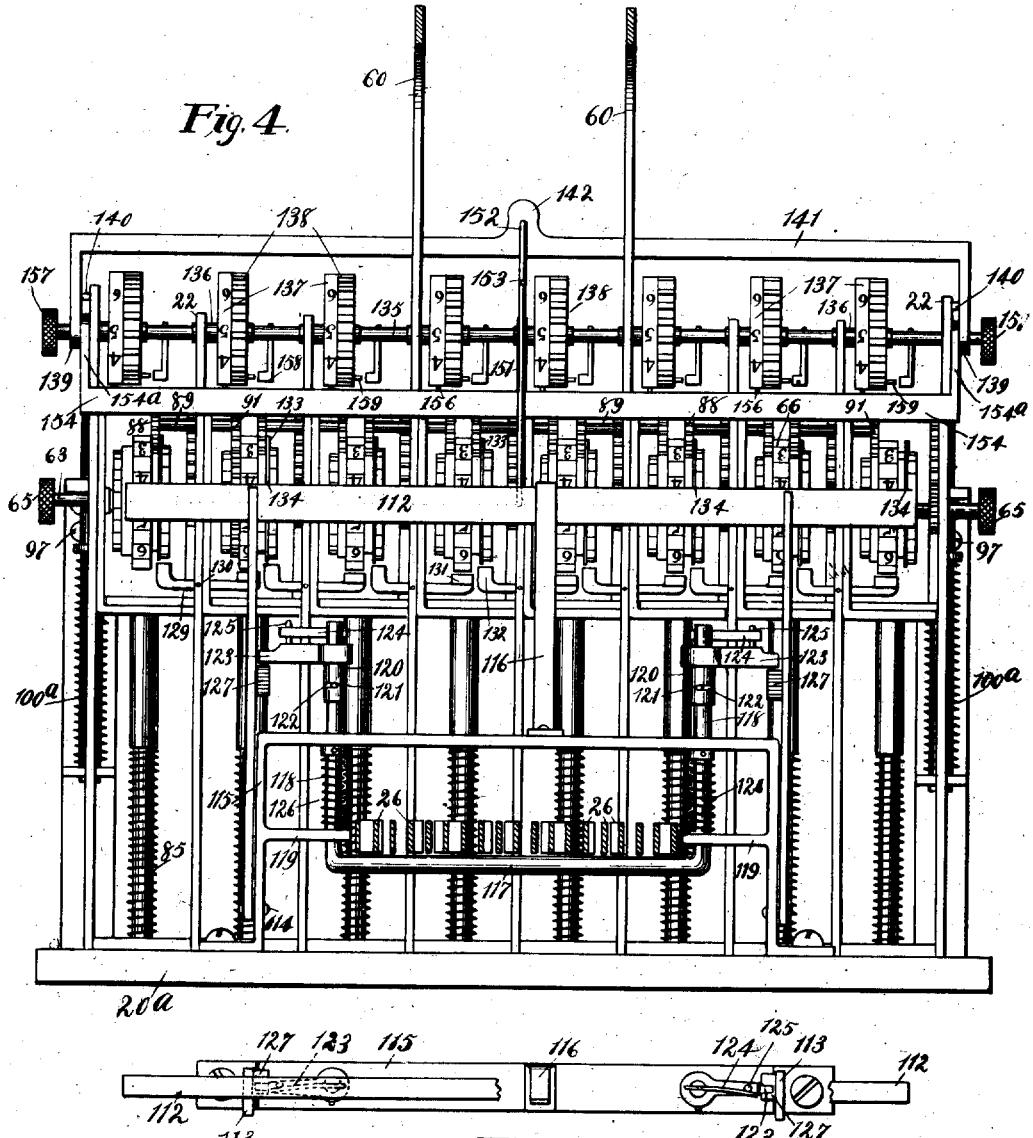

F. P. GLASNER & J. J. GLASIER.
COMPUTING MACHINE.
APPLICATION FILED JUNE 15, 1906.
901,092.
Patented Oct. 13, 1908.
7 SHEETS—SHEET 5.
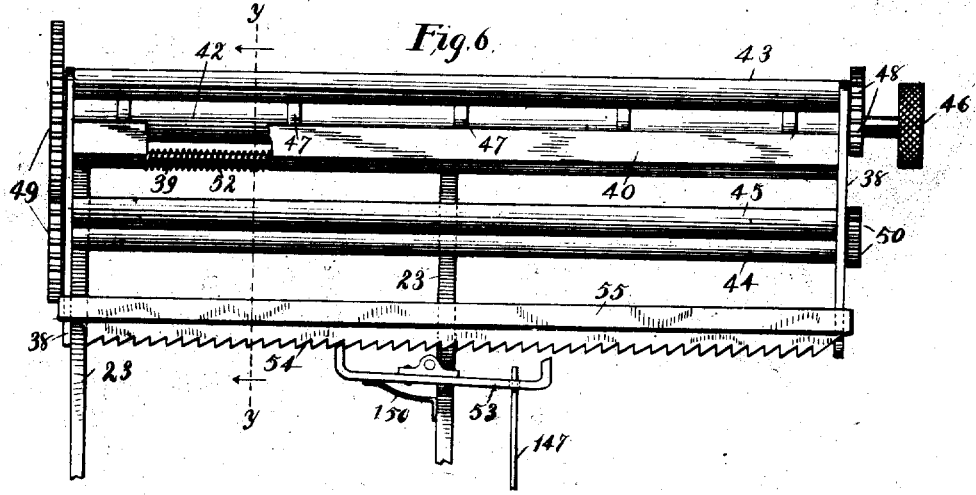
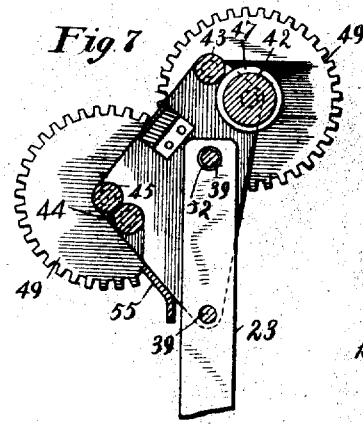
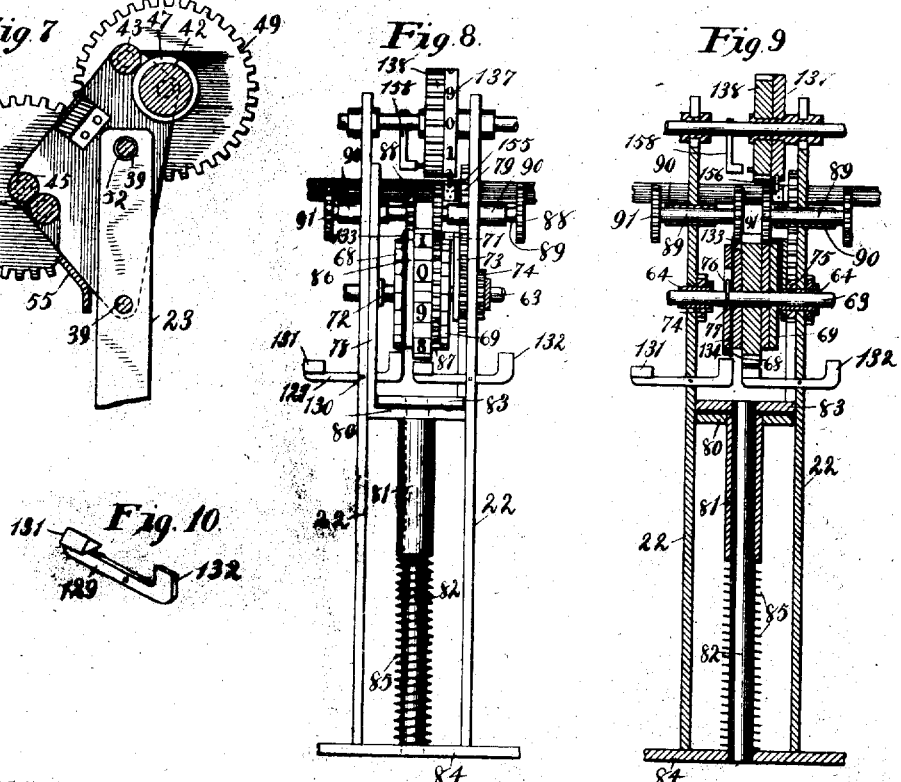
Witnesses:
Chas. J. Bassett
M. Marty
Inventors
Frank P. Glasner
John J. Glasier
By Frederick Suzanne
Atty.

F. P. GLASNER & J. J. GLASIER.
COMPUTING MACHINE.
APPLICATION FILED JUNE 15, 1906.
901,092.
Patented Oct. 13, 1908.
7 SHEETS—SHEET 6.
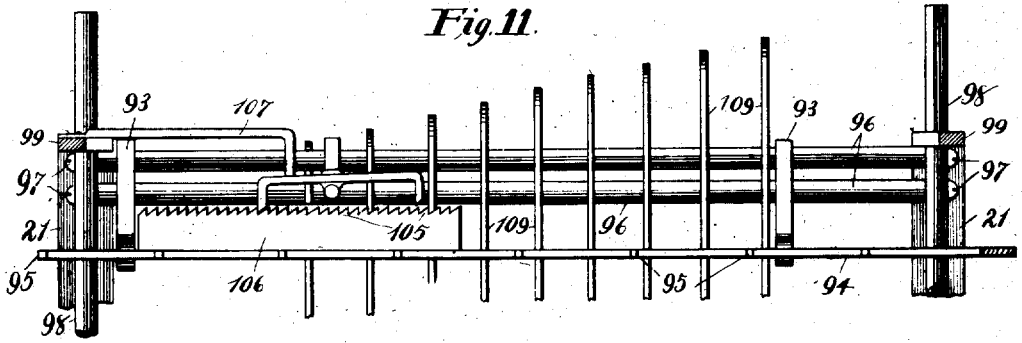
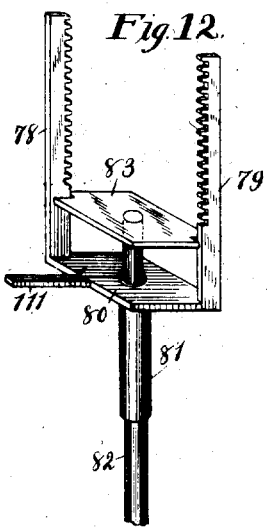
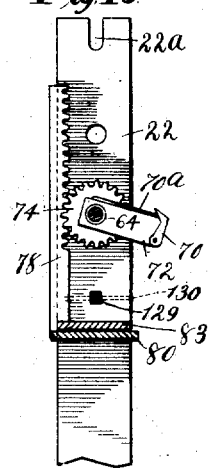
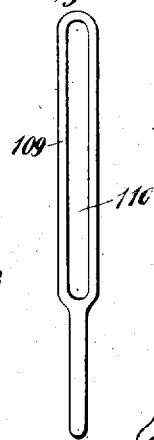
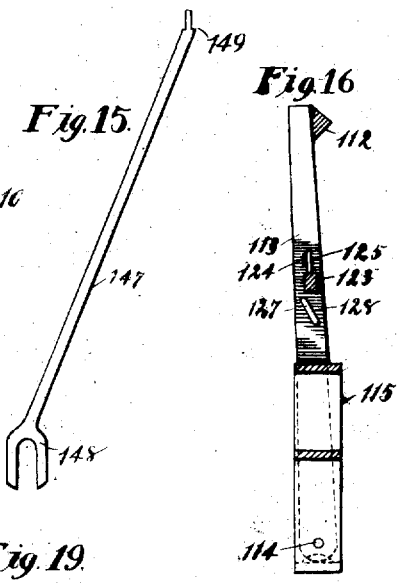
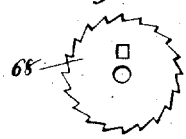
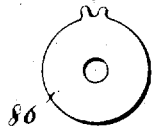
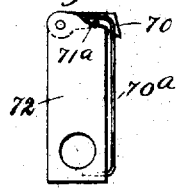
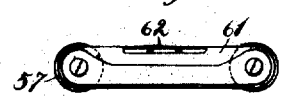
Witnesses:
Chas. F. Bassett
Inventors
Frank P. Glasner
Johnson J. Glasier
By Frederick _____ Atty F. P. GLASNER & J. J. GLASIER.
COMPUTING MACHINE.
APPLICATION FILED JUNE 15, 1906.

901,092.

Patented Oct. 13, 1908.
7 SHEETS—SHEET 7.

Witnesses:
Chas. F. Bassett
Mathew J. Marty

Inventors:
Frank P. Glasner
Johnson J. Glasier
By Frederick Benjamin
Atty.

UNITED STATES PATENT OFFICE.

FRANK P. GLASNER AND JOHNSON J. GLASIER, OF SPRINGFIELD, SOUTH DAKOTA.

COMPUTING-MACHINE.

No. 901,092.         Specification of Letters Patent.         Patented Oct. 13, 1908.

Application filed June 15, 1906. Serial No. 321,837.

*To all whom it may concern:*

Be it known that we, FRANK P. GLASNER, and JOHNSON J. GLASIER, citizens of the United States, residing at Springfield, in the county of Bonhomme and State of South Dakota, have invented certain new and useful Improvements in Computing-Machines, of which the following is a specification.

Our invention relates to typewriting and computing devices and its chief objects are to produce a combined typewriting and computing machine; to provide an apparatus for visibly recording an itemized statement of account and simultaneously therewith visibly indicating the totals of the figures thus recorded, and to devise a mechanism adapted to record, add and subtract simultaneously.

Further objects are to provide improved means for manifolding; to produce an apparatus having the parts so designed that a fine adjustment will not be required in assembling and which can in consequence be economically manufactured, and to provide an appliance having a simple construction and therefore not liable to get out of order.

Another object of our invention is to provide a simple and efficient locking mechanism for the computing elements thus insuring the proper coöperation of the working parts and obtaining accurate results.

A further object is to accomplish a variety of functions by a minimum number of manual operations.

We attain the above and other minor results by the use of type bars adapted to be operated by individual keys, recording means, computing means consisting of a plurality of parallel shafts carrying indicating elements and adapted to be operated either dependently or independently, and selecting means for rapidly and accurately indicating the total sum and difference of quantities recorded.

The principle upon which our computing device operates may be stated as follows:— A series of keys are arranged to operate type bars and numbering wheels simultaneously, so that the striking of a key will print the corresponding numeral upon a strip of paper, and at the same time selective mechanism will turn a wheel or series of wheels to indicate the same numeral or corresponding numerals, or in other words to print, and add or subtract at one operation, or to print, add and subtract by a single operation of a numeral key.

In the common forms of computing devices in use it is necessary to write or indicate a number of figures or quantities before the record becomes visible, and in some extensively used machines a lever movement is required in addition to the key depression. In our improved appliance on the other hand each recorded item becomes instantly visible and the key operation is all that is needed to produce the required results, thus conducing to rapid and accurate work. Another advantage lies in the use of a plane platen, by means of which the defects of the ordinary cylindrical impact surface are eliminated and the manifolding qualities materially increased.

In all numbering and computing devices great difficulty is experienced in preventing an excessive rotation of the numbering wheels. This is an inherent difficulty due primarily to the momentum acquired when the wheels are rotated a number of steps at one impulse. In order to prevent this, and in addition, to bring the indicating characters into perfect alinement, we have designed a universal locking device which will engage the indicating elements almost synchronously with the cessation of the operative impulse, and which has such a coarse adjustment that the ordinary and unavoidable deviations in the circumferential positions of the indicating characters will be promptly and unerringly corrected.

Figure 22:
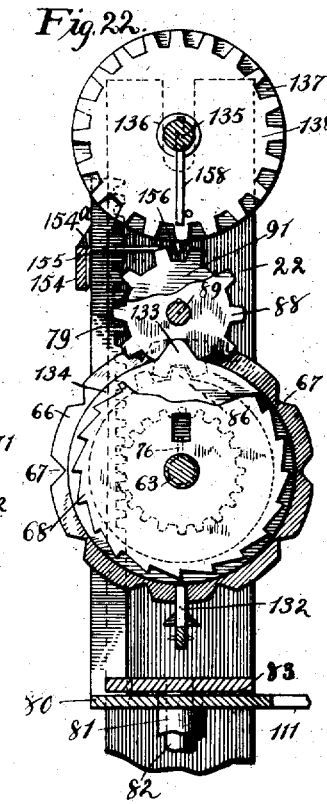
Figure 23:
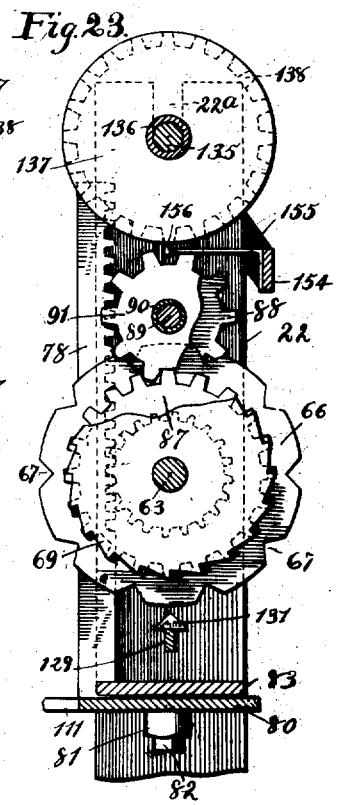
Figure 24:
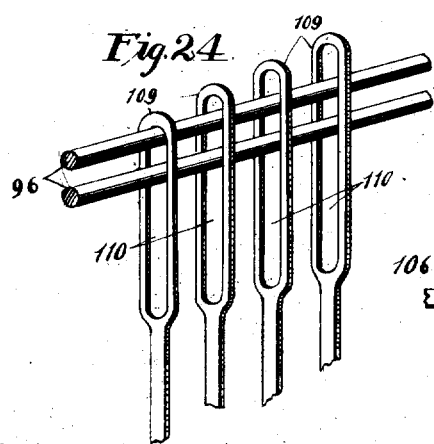
Figure 25:
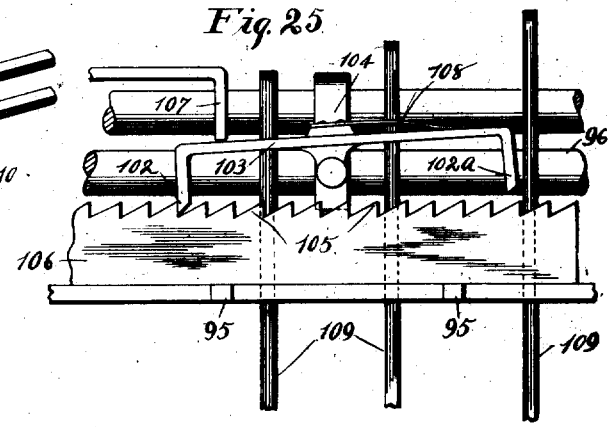

In the accompanying drawings which form a part of this specification:—Figure 1 is a plan view of our combined typewriter and computing device; Fig. 2 is a front elevation of the same; Fig. 3 is a side elevation with the keys broken away; Fig. 3ª is one of the shifting disks; Fig. 4 is a sectional view on the line $x$—$x$ of Fig. 1; Fig. 5 is a plan view of the universal locking device; Fig. 6 is a fragmentary view showing a front elevation of the paper carriage and platen; Fig. 7 is a sectional view on the line $y$—$y$ of Fig. 6; Fig. 8 is a front elevation of a portion of the computing mechanism; Fig. 9 is a vertical section of the mechanism shown in Fig. 8; Fig. 10 is a perspective view of one of the individual locking cams. Fig. 11 is a fragmentary view showing the selecting device as seen from the rear; Fig. 12 is a perspective view of the operating gear racks and attached plate; Fig. 13 is a fragmentary view showing a rack and pinion: Fig. 14 is a side view of one of the differential links; Fig. 15 is a side view of the paper carriage escapement lever operating link; Fig. 16 is a transverse sectional view of the locking device taken on the line z—z of Fig. 5; Fig. 17 is a side view of one of the ratchet wheels; Fig. 18 is a side view of one of the carrying gears, Fig. 19 is a side view of one of the pawl arms with its pawl attached. Fig. 20 is a front elevation of the ribbon spool carriage. Fig. 21 is an enlarged view of a part of the computing mechanism showing two number wheels of different series, with their component mechanism, a portion of the various details being broken away to disclose the allied ratchet disks in their material relation; Figs. 22 and 23 are views, enlarged, of the mechanism shown in Figs. 8, 9, and 21, viewed from opposite sides; Fig. 24 is a fragmentary perspective view illustrating the operation of the selecting links, and Fig. 25 is a fragmentary view, enlarged, of the escapement for the selecting carriage.

Referring to the drawings the numeral 20$^a$ indicates a base sustaining uprights 21, 22, 23, 24, which constitute the framework of the machine. A plurality of keys 25 are arranged near the front of the base to form a key-board, their levers 26 extending to the rear when they are pivoted on a universal rod 27 supported by spaced bearings 28 secured to the base. A series of flat springs 29 hold the key levers in their initial positions against a stop 30 fixed to the uprights 22, their downward movement being limited by a stop 37 secured in the same manner. A plurality of type bars 32 are pivoted on a rod 33 mounted in a spaced guide 34 and connected to the key levers by links 35. The guide 34 is supported by the uprights 24 and tie rods 35. The rod 33 is curved to form a segment of a circle the center of curvature coinciding with the middle point of the plates, so that when the bars are operated in the manner hereinafter described the type will all strike at a common center. Some of said type bars contain but a single type character; others however, are supplied with a plurality of characters constituting an abbreviation or an entire word. Since these characters, however, form no part of our invention, and may be inserted to correspond with the indications impressed upon the operating keys by any one skilled in the art, they are not more fully described.

The uprights 23 support a paper carriage 37 which is formed of end frame plates 38 tied together by rods 39 which slide in bearings in the uprights 23. A flat bar 40 faced with some suitable semi-elastic material 41 constitutes the platen and is secured at either end to the frame plates 38.

The paper feed mechanism comprises two sets of companion rollers 42, 43, 44, 45, (Figs. 3, 6, and 7) the main roller 42 being furnished with a finger wheel 46 and provided with spaced collars 47 formed of rubber or similar material, to insure proper feeding of the paper. The shafts of the rollers 42, 43, bear duplicate intermeshing pinions 48 upon their right hand ends, and the rollers 44, 45, also bear similar intermeshing pinions 50 upon their corresponding ends (Figs. 6 and 7). The drive roller 42 and driven roller 45 are connected by gears 49. By this arrangement the roller 46 drives the remaining paper feed rollers, 43, 44 and 45.

The carriage 37 is held against the resistance of a spring 52 by escapement lever 53 pivotally mounted upon one of the uprights 23, said pawl engaging the teeth 54 of a ratchet plate 55 attached to the carriage.

An ink ribbon 56 is wound upon spools 57 which slide on rods 58 carried by bars 59, 59$^a$, supported by inverted U shaped brackets 60, formed by a continuation of a pair of the uprights 22. The ribbon spools are rigidly connected by a bar 61 to which is attached a loop 62. The function of the said loop is to supply an engaging means for the end of a retracting lever, hereinafter described, which return the said spools to their initial position.

A shaft 63 is mounted in sleeves 64 fixed in the uprights 22, and is adapted to be reciprocated longitudinally by means of finger wheels 65 attached to the ends, and carries a plurality of numbering or indicating wheels 66 having the numerals 0 to 9 inclusive imprinted upon their faces, and provided between the numerals with notches 67. Each numbering wheel is furnished with ratchet disks 68, 69, (Figs. 8, 9 and 17) the teeth of one disk projecting in a direction opposite to those of the other. It will be noted that the said pinions 74, 75 are constantly in mesh with their respective racks so that when the latter are moved up and down in the manner hereinafter described both pinions will rotate at the same time, but in opposite directions, and the way in which the primary number wheel is rotated will depend upon which pinion has its pawl in mesh with the ratchet so that when one of the ratchets is operated the numbering wheel will be rotated in one direction and when the other ratchet is actuated the wheel will be turned in the opposite direction. These ratchets are actuated by pawls 70, 71, (Figs. 18, 13 and 15) carried on arms 72, 73, secured to pinions 74, 75 journaled on the sleeves 64 and provided with springs 70$^a$ and stops 71$^a$. The said sleeves 64 being fixed in the uprights 22 have no longitudinal movement when the shaft 63 is reciprocated. The ratchet disks 68 are provided with pins 76 which engage grooves 77 in the shaft 63 so that when the said shaft is reciprocated longitudinally the numbering wheels and attachments will be moved therewith, thus bringing the ratchets 68, 69, alternately into and out of engagement with their respective pawls. The pinions 74, 75 are driven by vertical racks 78, 79 rigidly secured to plates 80 supported upon the ends of sleeves 81 which reciprocate on vertical posts 82 secured at their upper ends to stay-plates 83 and at their lower ends to the foot-plate 84. The said sleeves 81 with their attached plates 83 are held in their normal position by compression springs 85.

The function of carrying from one denomination to another is provided for as follows: To each numbering wheel are attached a pair of gears 86, 87, having the same diametral pitch. The gear 86, however, is incomplete, only 1-10 of the teeth being left intact. The teeth thus remaining mesh with an intermediate gear 88 mounted on the end of a counter shaft 89 journaled in a sleeve 80, fixed in one of the uprights 22, said sleeve being shorter than the counter shaft to allow the latter to be shifted longitudinally. The opposite end of said counter shaft carries a gear 91 which meshes with the gear 87 attached to the numbering wheel of the next higher denomination.

A selecting carriage 92 (Figs. 1, 2, 3, and 11) is composed of vertical arms or brackets 93, adapted to slide upon horizontally disposed parallel rods 96, secured by screws 97 to vertical slide rods 98. These rods are slidably mounted in horizontal members 99, 100, formed integral with the standard or upright 21, and are yieldingly held in initial position by coiled springs 100ᵃ which surround the rods. The said brackets 93 are furnished at their lower ends with rearwardly extending projections which support a horizontally placed selecting plate 94, which is provided with lugs 95 (see Figs. 1, 3 and 25). This arrangement allows the carriage 92, constituted by the structures thus described, to have two movements; vertically by the longitudinal reciprocation of the shafts 98, and horizontally on the parallel rods 96.

When in its initial position the carriage is held in position against the tension of a spring 101 by the pallet 102 of an escapement lever 103, pivotally secured to an arm 104 fixed to the said rods 96. Said pallet 102 being held in engagement with teeth 105 of an escapement plate 106 by a stop 107 secured to one of the members 99. When the carriage 92 is depressed in a manner hereinafter described, the pallet 102 will be thrown out of engagement with the teeth 105 by means of a spring 108 and the pallet 102ᵃ will engage the said teeth, the pallets being so adjusted that one tooth will thus escape, allowing the carriage actuated by the spring 101 to move one step to the left. To the levers of the numeral keys, excepting the zero key, are attached links 109 varying in length and having slots 110 which engage the uppermost of the rods 96 when the keys are depressed and thus move the carriage 92 downward a distance corresponding with the denomination of the key operated. For example when the 3 key is depressed the carriage will descend three steps and when the 9 key is operated the carriage will be moved downward nine steps. The plates 80 are provided with lugs 111, with which the lugs 95 engage when the carriage 92 is depressed, provided the latter has been moved one or more spaces to the left so as to bring one of the lugs 95 above its corresponding lug 111. The lugs 95 are so spaced as to engage the lugs 111 in sequence as the carriage moves step by step to the left.

Inspection of Fig. 1 will show the left hand lug 95 one space to the right of the lug 111 corresponding with the wheel group of highest denomination. Depression of the carriage when in the position shown will have no effect upon any number wheel since none of the lugs are in proper position to engage. If one of the numeral keys is now struck the carriage will move one space to the left and then descend through the action of the link 109 attached to the key operated, and the left hand lug 95 will engage the left hand lug 111 to depress the plate 80 and rotate the corresponding number wheel, the one of highest denomination. All the other lugs 95 will have been moved one step nearer their corresponding lugs 111, and so the next depression of the selecting carriage will operate the second lug from the left to turn the second number wheel, and so on.

In order to insure accurate alinements of the numbering wheels and to prevent the danger of over rotation from the momentum of the moving parts, we provide a universal locking bar 112 triangular in cross section so as to be adapted to engage the notches 67. (See Figs. 3 and 16). Said bar is carried by arms 113 attached by pivots 114 to a frame 115 secured to the base. A flat spring 116 tends to keep said bar in engagement with the numbering wheels and a stop 112ᵃ limits its backward movement. A rod 117 extends beneath the key levers its ends 118 being bent vertically upward to pass through holes in horizontal arms 119 projecting from the said frame and also through holes in the upper member of the frame. The vertical portions 118 are furnished with sleeves 120 adapted to turn thereon, their movement being limited by stop pins 121 which project through slots 122. The said sleeves are provided with horizontally projecting fingers 123 which are held in initial position against the stop pins 121 by springs 124 secured in the vertical members 118 and engage pins 125 fixed in the upper sides of said fingers.

The bar or rod 117 (Figs. 4 and 5) is yieldingly supported on compression springs 126 and is so placed in relation to the key levers that the depression of any key will cause the said rod and attached fingers to descend and when the key lever is released the said springs will restore the parts to their initial position. Upon the inner surface of the arms 114 are located cams 127 having inclined faces 128 with which the fingers 123 engage when depressed by the action of any key, thus rocking the arms 114 and releasing the locking bar 112 from its engagement with the notches 67 of the numbering wheels. The fingers in their downward movement pass below the cams and when they clear the interior margins of said cams, the spring 116 will cause the locking bar to fly back to its initial position in engagement with the notches 67, and the springs 124 permit the fingers to yield when ascending the rear surfaces of the cams. In addition to this universal locking mechanism, we provide individual locking levers 129, which rock on pivots 130 in the uprights 22, one end having a triangular lug 131 adapted to engage the notches 67 when the opposite end 132 is depressed by a lug 133 formed integral with a shifting disk 134 attached to each numbering wheel. The circumferential position of said lug 133 in relation to the numerals marked upon the face of the wheels being such that the lever 129 will be operated at the proper time to prevent over-rotation of the wheel with which it engages during the act of carrying. This device is rendered necessary because the locking lever is retracted during the operation of the indicating mechanism and the process of carrying to a wheel of higher denomination might over-rotate said wheel, unless provision was made to check such tendency.

The function of the shifting disk 134 is to prevent throwing the pinions 88, 91 out of gear when the shaft 63 is reciprocated. The pinion 88, being in engagement with the shifting disk upon one side and the numbering wheel upon the other, the said pinions and the countershaft 89 are made to follow the longitudinal movements of shaft 63.

The upper ends of the uprights 22 are provided with slots 22ª to receive an auxiliary shaft 135 carrying sleeves 136 upon which are rotatably mounted auxiliary numbering or indicating wheels 137 provided with gears 138 which are adapted to mesh with the carrying gears 91. The faces of said gears 138 are of sufficient width to prevent being put out of gear with the gears 91 when the latter are shifted by a longitudinal reciprocation of the shaft 63. The shaft 135 is supported at each end by cams 139 attached to the outside uprights 22 by pivots 140, said cams being connected by a bar 141 provided with a thumb plate 142, by means of which the said shaft can be raised and lowered sufficiently to put the toothed wheels 138 and 91 in and out of gear.

In order to provide for the synchronous movement of the paper carriage 37 and the selecting carriage 92, the escapement lever 103 is made removable by means of the thumb nut 143 and the spring 101 can also be removed by disengaging its ends from their attachments, the selecting carriage will now be free to be moved in either direction. It is provided with a rearwardly projecting arm 144 with which the paper carriage will engage when moved to the left by the action of its spring 52. The arm 144 is furnished with a knife joint 145 so that the distal portion can be folded upon the fixed part, a spring 146 insuring its retention in either position, and when in its folded position the two carriages will move independently of each other. The escapement lever 53 of the paper carriage is actuated by a link 147 the lower end of which is fashioned into a fork 148 which engages the rod 117, its upper end entering a hole in the said lever, engaging the latter by shoulders 149. When the said rod is depressed by any key the link 147 will descend by gravity and the spring 150 will oscillate the escapement lever thus permitting one tooth of the rack 55 to escape and allow the carriage 47 to move one step to the left.

To the universal locking bar 112 is attached a lever 151 the upper end of which is bent to form a crook 152 its point 153 engaging the anterior face of the bar 61, when the said locking bar 112 is moved backward will slide the ribbon spools upon their spindles 58, the adjustment being such that the ribbon overlies the platen synchronously with the impact of the type thereon. When the said bar 112 and lever 151 are retracted to their initial position the point 153 which has passed down through the loop 62, will upon its return movement engage the said loop 62 and slide the ribbon spools to their original position.

In the case of the primary numbering wheels 66 no special provision is made for clearing as that result can be readily obtained by striking the required keys to add a quantity that will bring all the wheels to 0. With the auxiliary indicating wheels, however, it is more convenient to provide a special mechanism for clearing. Upon a bar 154 swung by arms 154ª to the shaft 135 are secured yielding stops 155 which engage pins 156 projecting from the face of the numbering wheels when they rotate in one direction, but yield when they rotate in the opposite direction. The shaft 135 can be reciprocated longitudinally by means of finger wheels 157 fixed to the ends. The shaft is provided with arms 158 which engage pins 159 in the sides of the numbering wheels. To set the wheels to 0 the arms 158 are brought into engagement with the pins 159 and the shaft is then turned in the direction in which the wheels are free to move until at least one complete revolution has been made. The rotation of the shaft is then reversed until all the wheels are brought against the stops 155, after which the shaft is shifted to the left and the wheels are ready for a new operation.

Having thus described the construction of the apparatus and the functions of the various parts, we will now outline the method of operating the machine. A suitable ticket or sheet having been inserted between the paper feed rollers, and adjusted by means of the finger wheel to the proper position the operator depresses one of the keys in the second row of the key board, having a letter, or word inscribed thereon. Supposing he desires to render a statement to a depositor, he will strike the key marked "Depos" and the type bar connected thereto will print the word "Deposit" upon the sheet of paper, the carriage moving one step to the left. In the construction illustrated the word so recorded would necessarily be condensed or the type body placed transversely or an abbreviation employed. If one of the numeral keys is now struck its attached typebar will print the corresponding numeral and at the same time the selecting device will be moved one space to the left, and instantly depressed by the action of the link attached to the key operated. If the 4 key is struck the selecting device will move downward four steps and the lug will engage the lug projecting from the plate corresponding with the numbering wheel selected which in this case would be the highest denomination and the numbering wheel will be revolved four steps, or in other words 4/10ths of a revolution. If the 9 key were struck the wheel would move 9/10ths of a revolution. The next numeral key to be struck will act upon the selecting carriage in the same manner, always causing it to move one step to the left and depressing it to a distance corresponding to the key denomination. The lugs are so spaced with reference to the lugs with which they engage that the selection of the numbering wheel will be from left to right. In the example cited, all the numbering wheels will be acted upon in sequence as the various numeral keys are struck, and a number consisting of eight places will be imprinted upon the paper and indicated upon the numbering wheels simultaneously. If it is desired to write a number having five places the selecting carriage must first be moved three places to the left before any numeral keys are struck. Then striking five numeral keys in succession will cause the recording and indicating of a corresponding number of five places. When the required number is imprinted the selecting device must be replaced at the initial position by moving it to the right. It will be noted that while the movement of the selecting carriage is from right to left the selection of the numbering wheels proceeds from the left to the right.

Since the primary numbering wheels 66 can be alternately rotated in both directions but have a single series of numerals imprinted thereon it follows that turning said wheels in one direction will have the effect of adding the quantities represented and the reverse movement will subtract them. Only one of these operations, however, being possible at the same time, in order to both add and subtract synchronously, it is necessary to bring the auxiliary shaft 135 into action. This is done instantaneously by throwing the cams 139 through the medium of the thumb plate 142, the shaft 63 being reciprocated at the same time to the right. The depression of any numeral key will now operate the racks 79 in sequence which will cause the corresponding primary numbering wheels to turn backward and the total will indicate the difference between the original quantity shown and the amount struck upon the key board. In this case the process of carrying is also reversed so that the correct result is invariably attained. As the auxiliary shaft, as stated above, has been brought into operative position, the numbering wheels carried thereon will be concurrently rotated and will indicate the sum of the digits struck upon the keys. Thus the three functions of recording, adding and subtracting will be simultaneously performed at each touch of a numeral key.

It is obvious that many changes may be made in the devices of my invention without departing from the spirit and scope thereof and we do not, therefore, wish to be limited to the precise construction herein set forth.

Having thus described our invention what we claim is:—

1. In a computing apparatus, the combination of typewriting mechanism, numeral keys, operative connection between said keys and the typewriting mechanism, a main shaft, operative connection between said shaft and the keys, a series of primary number wheels mounted upon said shaft, a second shaft arranged parallel to the said main shaft, a series of secondary number wheels mounted upon said second shaft, means for operatively moving both of said series of number wheels simultaneously, and means for reversing the movement of the wheels of both series.

2. In a computing apparatus, the combination of typewriting mechanism, a series of keys, operative connection between said keys and the typewriting mechanism, a main shaft, operative connection between said shaft and the keys, a series of primary number wheels mounted upon said shaft, a second shaft arranged parallel to the main shaft, a series of secondary wheels carried upon said second shaft, means for moving either series of wheels independently of the other series, means for putting said series of wheels into and out of gear with each other, and means for reversing the movement of said primary wheels.

3. In a computing apparatus, the combination of typewriting mechanism, a series of keys, operative connection between said keys and the typewriting mechanism, a main shaft, operative connection between said shaft and the keys, a series of primary number wheels mounted upon said shaft, means for moving said shaft longitudinally, a second shaft arranged parallel with the said main shaft, a series of secondary number wheels carried upon said second shaft, means for shifting the secondary wheels into and out of gear with the primary wheels, and means for locking the said primary wheels.

4. In a computing machine, the combination of typewriting mechanism, numeral and character keys, operative connection between said keys and the typewriting mechanism, a main shaft, operative connection between said shaft and the keys, a series of primary number wheels loosely mounted upon said shaft, means for moving said shaft longitudinally, means for rotating said primary wheels, means for reversing said rotating movement, a second shaft arranged parallel to the shaft of the primary wheels, and means for shifting said second shaft laterally to bring the wheels mounted thereon into gear with the said primary wheels.

5. In a computing machine, the combination of typewriting mechanism, a plurality of numeral and character keys, a main shaft adapted to be shifted longitudinally in its bearings, operative connection between said shaft and said keys, a series of primary number wheels loosely mounted upon said main shaft, means for moving said number wheels alternately in opposite directions, a universal locking member adapted to be moved to engage said primary wheels, a second shaft arranged parallel to said main shaft, a series of secondary number wheels carried upon the second shaft, means for shifting said second shaft laterally, and means for resetting the secondary series of wheels.

6. The combination in a computing apparatus, of typewriting mechanism, a key board, shafts arranged parallel to each other, a series of number wheels mounted upon each of said shafts, operative connection between the key board and the typewriting mechanism and said series of wheels, said operative connection being adapted to turn one of said series of wheels in either direction, and means for shifting the other of said series of wheels into and out of gear with the first mentioned series of wheels.

7. An apparatus for the purpose specified including a key-board comprising character and numeral keys, typewriting mechanism connected with said key board, a plurality of numbering wheels arranged in series, means for operating one of said series in either direction, means for operating said series singly or in unison by means of said numeral keys, and means for simultaneously locking said numbering wheels after being operated, said means consisting of a movable member adapted to engage said numbering wheels.

8. An apparatus for the purpose specified including a key board comprising letter and numeral keys, typewriting mechanism connected with said key board, and provided with an ink ribbon, means for shifting said ribbon to render the record visible, a plurality of numbering wheels arranged in parallel series, said series adapted to be operated singly or in unison, means for operating said wheels by the depression of said numeral keys, means for rotating one of said parallel series of wheels in reverse directions, and means for simultaneously locking said numbering wheels after being operated.

9. An apparatus for the purpose specified including a key board comprising letter and numeral keys, type bars connected with said key board, a carriage for the paper, a platen carried by said carriage, means for shifting the carriage by the depression of the keys, an ink ribbon, means for shifting the ribbon to render the record visible, a plurality of numbering wheels arranged in parallel series, said series adapted to be operated singly or in unison, means for operating said wheels by the depression of said numeral keys and means for locking said numbering wheels simultaneously.

10. An apparatus for the purpose specified including a keyboard comprising letter and numeral keys, type bars connected with the individual keys of the key board, a carriage carrying paper rollers, a platen, means for reciprocating the said carriage by the depression of the keys, means for shifting the ribbon to render the record visible, a plurality of numbering wheels arranged in parallel series, means for operating said series singly or in unison, means for operating one of said series of wheels in reverse directions, and means for locking all of said wheels simultaneously.

11. A computing machine, including character and numeral keys, typewriting mechanism operatively connected with said keys, a main shaft, a series of primary number wheels loosely mounted on the main shaft, operative connection between said shaft and the keys, means for moving said shaft longitudinally, means for turning said number wheels alternately in opposite directions, a second shaft arranged parallel to the main shaft, a series of secondary number wheels carried upon said second shaft, means for shifting the second shaft laterally, means for resetting said secondary wheels, and a locking member for the primary wheels, said member consisting of a rock-bar adapted to engage the faces of said primary wheels.

12. An apparatus for the purpose specified including a key board having a plurality of letter and numeral keys, typewriting mechanism adapted to produce visible writing, connections between the said typewriting mechanism and the keys of the keyboard, a plurality of primary numbering wheels, means for rotating said wheels alternately in opposite directions by the depression of the numeral keys, auxiliary numbering wheels capable of being operated simultaneously with the operation of said primary numbering wheels, means for locking said primary numbering wheels, said locking means consisting of a movable universal member adapted to engage all of said numbering wheels simultaneously.

13. An apparatus for the purpose specified including a key board having a plurality of character and numeral keys, typewriting mechanism adapted to produce visible writing, connections between the said typewriting mechanism and the keys of the key board, a plurality of primary numbering wheels, means for rotating said wheels alternately in opposite directions by the depression of the numeral keys, auxiliary numbering wheels normally held inoperative, means for rendering said auxiliary wheels operative, means for simultaneously locking all the primary numbering wheels and means for simultaneously unlocking all of said primary numbering wheels.

14. An apparatus for the purpose specified, including a key board consisting of a plurality of individual letter and numeral keys, typewriting mechanism adapted to produce visible writing, operative connection between the typewriting mechanism and the keys, a plurality of primary numbering wheels, a selecting carriage, means for shifting said carriage longitudinally, means for reciprocating said carriage vertically, means for operating said numbering wheels by the depression of the carriage, operative connection between the keys and said carriage, auxiliary numbering wheels normally inoperative, means for rendering said auxiliary wheels operative, means for simultaneously locking all the primary numbering wheels and means for simultaneously unlocking all of said primary numbering wheels.

15. An apparatus for the purpose specified including a key board having a plurality of letter and numeral keys, typewriting mechanism adapted to produce visible writing operative connection between the typewriting mechanism and the keys, a plurality of primary numbering wheels, a selecting device for said wheels, means for shifting said selecting device both longitudinally and vertically, means for rotating said numbering wheels by the vertical reciprocation of said selecting device, operative connection between the keys and said device, auxiliary numbering wheels normally inoperative, means for placing said auxiliary wheels into and out of operative position, means for clearing said auxiliary numbering wheels, and means for simultaneously locking and unlocking all of said primary numbering wheels.

16. An apparatus for the purpose specified including a key-board composed of a plurality of letter and numeral keys, typewriting mechanism adapted to produce a visible record, operative connection between the typewriting mechanism and the keys, a carriage provided with paper holding mechanism and a platen, a plurality of primary numbering wheels, operative means for said wheels, a selecting device for said wheels, means for shifting said selecting device both longitudinally and vertically, operative connection between the selecting device and the keys, auxiliary numbering wheels normally held inoperative, means for rendering said auxiliary wheels operative, means for clearing said auxiliary wheels, means for simultaneously locking and unlocking all of said primary numbering wheels and operative connection between the said carriage and the said selecting device.

17. An apparatus for the purpose specified including a key board composed of a plurality of letter and numeral keys, recording mechanism adapted to produce a visible record, operative connection between the recording mechanism and the keys, a paper feeding device, a platen having a plane impression surface, operative means for shifting said platen, a plurality of primary numbering wheels, a selecting device for operating said wheels seriation, auxiliary indicating wheels arranged in series, means for operating said indicating wheels seriation, means for rendering said indicating wheels alternately operative and inoperative, means for operating said primary numbering wheels and said indicating wheels simultaneously, means for reversing the rotary movement of the numbering wheels, means for clearing said indicating wheels and means for simultaneously locking and unlocking all of the numbering wheels.

18. An apparatus for the purpose specified including a key board composed of letter and numeral keys, a plurality of type bars connected with the individual keys of the key board, a guide for the key bars, a carriage provided with a paper feeding device and carrying a platen having a plane surface, means for reciprocating said carriage, an ink ribbon, means for shifting the ribbon to render the writing visible, a plurality of primary numbering wheels, operating means for the numbering wheels, means for reversing the rotary movement of said wheels, selecting means for operating said wheels seriation, connection between the said selecting means and the numeral keys, auxiliary indicating wheels arranged in series, means for putting said indicating wheels into and out of operative position, means for operating said indicating wheels seriation, means for clearing the said indicating wheels, means for operating said primary numbering wheels and said indicating wheels simultaneously, and means for concurrently locking or unlocking all of the numbering wheels.

In testimony whereof we affix our signatures in presence of two witnesses.

FRANK P. GLASNER,
JOHNSON J. GLASIER.

Witnesses:
CHAS. HILL,
LENA GLASIER.